May 10, 1932. K. E. PEILER 1,857,257
METHOD AND MACHINE FOR FORMING GLASS TUBING FROM PRESSED GLASS BLANKS
Filed Dec. 11, 1928
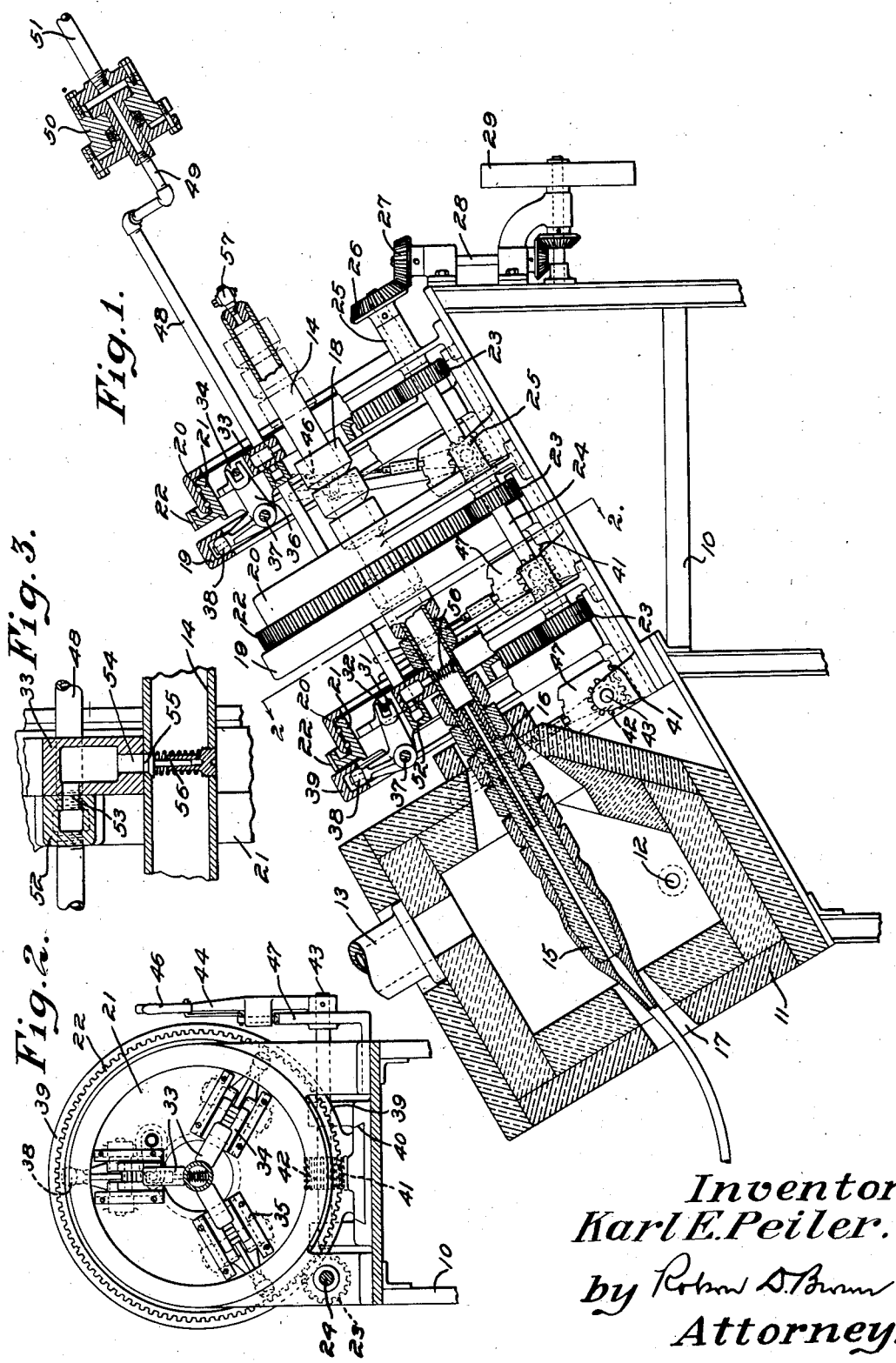
Inventor
Karl E. Peiler.
by Robert D. Brown
Attorney.

Patented May 10, 1932

1,857,257

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD AND MACHINE FOR FORMING GLASS TUBING FROM PRESSED GLASS BLANKS

Application filed December 11, 1928. Serial No. 325,203.

My invention relates to the art of making glass tubing or cane. More particularly it constitutes improvements in apparatus and processes for producing such tubing or cane from annular pressed billets of glass which are threaded upon a mandrel on which they are melted or softened and from the end of which tubing is drawn.

It has heretofore been proposed to manufacture glass tubing or cane by threading annular pressed billets of glass onto a vertical mandrel projecting downward through a vertical shaft furnace. By this method the glass billets passing down the mandrel become heated and the glass thereof softens or melts and runs down in tubular form from which tubing is drawn. As the billets become hot, they weld together and therefore form a continuous supply of glass. A supply of compressed air is furnished through the mandrel to prevent collapse of the tubing being drawn. This proposal however falls far short of providing an adequate apparatus or method by which the billets may be softened or melted and the glass suitably formed into tubing or cane.

The object of the present invention is to provide an improved process of forming tubing or cane from glass billets and an apparatus practically adapted to carry out such process. For this purpose, I provide a continuously rotating mandrel and adequate means for causing its rotation, thus assuring that a symmetrical supply of homogeneous glass is presented at the end of the mandrel for the drawing operation. The apparatus provides novel means for holding and rotating the mandrel in a desired position, while at the same time permitting the feeding of the successive billets of glass thereon, while the mandrel is rotating. It also provides efficient means for assuring a supply of compressed air through the center of the mandrel, in the manufacture of tubing, while at the same time permitting the feeding of the billets.

The invention also provides a novel form of glass billet for use in tube or cane making, which assures at the drawing end of the mandrel a supply of glass which is free from included bubbles of gas or air. Other and further objects of the invention will appear from the following specification and claims.

Generally speaking, I propose to provide an inclined rotating mandrel, having a hollow tubular metallic core and provided at its lower end with a refractory covering or tip. This mandrel is to project at an angle to the horizontal and downwardly into a heating and temperature regulating furnace. This furnace is to be so constructed and arranged as to gradually heat the billets as they move down the mandrel and to bring them to the proper temperature, first to weld one to another and then to reduce the glass to the proper consistency for tube drawing. The mandrel is supported and rotated by a plurality of chuck units, parts of which are arranged and mounted for rotation about the axis of the mandrel. Each of these chuck units is provided with an annular opening, sufficient to permit the passage of billets therethrough when the gripping jaws of the chuck are withdrawn from the mandrel. The arrangement is such that the jaws of the several chucks may be successively withdrawn to permit the threading of the billets upon the mandrel, while maintaining suitable bearing and driving connections to support and continuously rotate the mandrel.

The apparatus also provides suitable means for supplying the compressed air to the interior of the mandrel, when tubing is to be drawn.

One embodiment of the mechanical features of my invention is shown in the accompanying drawings, in which:

Figure 1 is a view partly in elevation and partly in section of my improved tube drawing apparatus;

Fig. 2 is an end elevation of one of the chuck units viewed as indicated by the line 2—2 of Fig. 1; and Fig. 3 is an enlarged view of a part of the apparatus shown in Fig. 1, illustrating the means for applying compressed air to the interior of the mandrel through the jaws.

Referring to the drawings, 10 represents a support for the apparatus. 11 is a furnace or heating shaft provided with suitable heating means as burners 12 and chimney 13. A hollow metallic mandrel 14 is disposed in a plane inclined to the vertical and has a refractory lower end portion 15, the head of which is somewhat enlarged, projecting into a suitable opening 16 in the furnace. The furnace is provided with another opening 17 in line with the mandrel through which the tubing or cane may be drawn. A succession of glass billets 18 are threaded upon the mandrel 14 and are gradually and successively moved within the furnace 11 where the glass is softened or melted and brought to the proper consistency to form tubing or cane.

The mandrel is supported and rotated by three rotating chuck units 19. These units are substantially identical. Each chuck assembly comprises an annular bearing 20, supported by the base 10 and provided with suitable roller or ball bearings for an annular rotating chuck jaw carrying member 21. The member 21 is provided with a ring gear 22, adapted to mesh with a pinion 23 mounted on a shaft 24, which is mounted in suitable bearings 25 supported by the support 10. The shaft 24 carries a beveled gear 26 adapted to mesh with the second beveled gear 27, mounted on a shaft 28 which is continuously driven through suitable gearing from a source of power (not shown) through the pulley 29. In this way the chucks are rotated in synchronism at the desired speed.

Slidably mounted upon each of the members 21 are a plurality of mandrel gripping jaws 33 provided with a sliding portion 34 adapted to slide in slide ways 35. The jaws 33 may thus be moved radially of the member 21, inwardly to grip the mandrel 14 and outwardly to release the mandrel and permit billets 18 to pass the chuck units on their way toward the drawing end of the mandrel. Sliding movement of the jaws 33 is effected through bell crank levers 36 which are pivotally mounted as at 37 upon extensions of the member 21 and which have bifurcated portions 31 adapted to act on pins 32 carried by the parts 34 of jaw 33. The outer arm of each bell crank 36 carries a roll 38 which is adapted to engage an annular clutch member 39.

The member 39 is mounted for sliding movement in a slide way 40 supported by the structure 10, and is provided with a rack 41 adapted to mesh with a pinion 42, which is mounted on a shaft 43. An operating lever 44, provided with suitable detent member 46 and sector 47, is mounted upon the shaft 43. By movement of the handle 44 of a particular chuck unit the gripping jaws 33 of that unit may be moved into or out of gripping relation with the mandrel. If desired, suitable springs may be interposed in the clutch mechanism to provide a resilient pressing contact of the jaws.

By the provision of the plurality of chuck units, all driven from a common drive at the same speed, as shown in Fig. 1, and provided with individual means for gripping and releasing the mandrel, the mandrel may be at all times properly supported by at least two of the chuck units and is continuously rotated at a desirable constant speed. I am also enabled to successfully thread the billets of glass onto the mandrel and successively past the several chuck units without stopping the operation of the apparatus.

In drawing tubing, compressed air is supplied to the interior of the mandrel from a source (not shown) through the pipes 48, 49 and 51 through the several chuck mechanisms and jaws, thus maintaining the desired constant pressure within the mandrel through at least some of the chuck units at all times.

The pipe connection 48 communicates with the boxes 52 mounted in each of the members 21 of the chuck units, passing through all of these boxes except the last. As the boxes 52 rotate with the member 21, the pipe 48 must also rotate. Hence the pipe 48 is offset from a pipe 49 which is mounted axially of the axis of rotation of the member 21. The pipe 49 is provided with a swivel connection to the pipe 51 from the source of pressure through a stuffing box 50.

Each box 52 communicates through a passage 53 with the interior of one of the jaws of its unit when the jaw is in gripping position. This communication is broken when the jaw 33 is out of gripping position. The jaw member is provided with a downwardly opening outlet which communicates with an opening 55 in the mandrel. This opening 55 is supplied with a check valve 56 to prevent the escape of air when the jaw is not in gripping position.

Since one or more groups of the clutching jaws are always in contact with the mandrel, air is constantly supplied to the interior of the mandrel at a suitably selected pressure to prevent the collapse of the glass tubing being drawn. If desired, an adjustable escape valve 57 may be provided at the upper end of the mandrel to permit cooling of the mandrel by supplying excess air and allowing such excess air to escape.

In order to prevent the inclusion of air between the abutting surfaces of adjacent billets as they are softened, the billets are formed, as shown in Fig. 1, with at least one end surface curved or beveled so that it will contact with its adjacent billet only at the inner portions near the mandrel, when first threaded thereon. By this arrangement I assure that when the billets gradually become soft and slump into more intimate contact with each other, the contact area gradually extends from the inner portions of contact area adjacent the mandrel toward the outside portions and the air between the surfaces is provided with a vent to the outside and is gradually forced out. If desired, both ends of the billets may be rounded or one end may be flat and the other end rounded.

These billets may be formed by pressing in the usual manner. I prefer, however, to press these billets in a mold which is provided with a central removable core, which is placed in the mold prior to charging the mold with glass, and I may either then press the glass by moving a plunger down around the core, or I may use a plunger which presses downwardly against the core, the core in the latter case being so provided that it recedes as the plunger presses the glass into shape. In either event, the core should preferably be withdrawn as soon as convenient to prevent the glass from seizing on it. It is of importance that the opening through the billets be maintained of proper size and shape. Hence, it may prove desirable to provide a roll or other implement to press against the interior of the billet during the cooling process.

In performing my novel method of fabricating glass tubing or cane by the use of the above described apparatus, the temperature of the furnace 11 is brought to the proper degree and the driving mechanism is operated at the proper selected speed. In making tubing, compressed air at the proper pressure is provided in the pipe 51. This is not necessary in making cane. Billets of glass formed as above described are threaded on to the mandrel. As a billet or group of billets approach the first of the chuck units, the operator moves the lever 44 to move the jaws 33 of that unit from mandrel engaging relation. This provides an annular opening through the unit sufficient for passage of the billets. After the billets have passed through this unit, the operator moves the handle 44, to return the jaws 33 of that unit to gripping position. In a similar manner the billets are passed through the succeeding chuck units. There are thus always at least two of the three units supporting and driving the mandrel.

As the billets approach the furnace 11, they begin to soften and weld together. Because of their peculiar shape, they weld from the inside toward the outside and thus prevent trapping of air in the melting glass. The glass is finally brought to a suitable tube or cane drawing temperature, and then forms a cylindrical layer over the refractory end of the mandrel. The glass is then drawn, as tubing from the end of the mandrel, air pressure being supplied through the mandrel when drawing tube to prevent the tube from collapsing, or as cane, in which case no air pressure is supplied.

The apparatus may be modified in many ways without departing from the spirit of my invention as set forth in the appended claims. For instance, the number of chuck units may be reduced to two and the lower end of mandrel may be provided with a bearing comprising a roller bearing which supports the mandrel through the billets. Such bearing must be located sufficiently from the furnace 11 to assure that the glass will be sufficiently hard to bear the load.

I claim:

1. The method of continuously forming glass tubing which comprises, rotating a continuous series of internally supported annular glass billets while moving the same endwise of the series into and through a melting zone while melting the billets to form a cylinder of molten glass, supplying compressed air within the cylinder, and drawing glass tubing from the glass so formed.

2. The method of forming glass tubing which comprises, providing a continuous series of annular pressed glass billets upon a hollow mandrel, continuously rotating the mandrel, moving the billets into and through a melting zone whereby the billets are reduced to a layer of workable molten glass surrounding the end of the mandrel, continuously supplying compressed air to the interior of the mandrel, and drawing tubing from the glass so formed.

3. The method of forming glass tubing which comprises, moving a continuous series of internally supported annular pressed glass billets endwise of the series into a melting compartment, melting the billets therein to form a cylinder of molten glass, preventing the collapse of the cylinder by supplying compressed air therein, continuously rotating the billets and the cylinder of glass, and drawing tubing from the glass so formed.

4. The method of forming glass tubing which comprises, threading a continuous series of annular pressed glass billets onto the upper end of an inclined constantly rotating mandrel, successively passing the billets of the series into a furnace, melting the billets therein to form a cylinder of molten glass, supplying compressed air within the cylinder, and drawing glass tubing therefrom.

5. The method of continuously forming glass cane which comprises, rotating a continuous series of internally supported glass billets, while moving the same endwise of the series into and through a melting zone, heating the billets to form molten glass of workable consistency, and drawing cane therefrom.

6. Apparatus for the manufacture of glass tubing from annular pressed glass billets which comprises, a mandrel adapted to receive the billets, means for continuously rotating the mandrel, means for supplying compressed air within the mandrel, heating means surrounding the lower end of the mandrel to melt the billets thereupon, and means for drawing tubing from such glass.

7. Apparatus for forming glass tubing from annular glass billets which comprises, a mandrel inclined from the vertical and adapted to receive glass billets on its exterior, means for continuously rotating the mandrel and billets, means for melting the billets as they successively approach the lower end of the mandrel to form a cylinder of workable molten glass about the lower end of the mandrel, means for supplying compressed air within the mandrel, and means for drawing the glass from the lower end of the mandrel.

8. Apparatus for forming glass tubing which comprises, an inclined rotating mandrel adapted to receive a continuous series of annular glass billets and to successively present such billets to a melting zone, heating means to melt the billets, and means for continuously rotating the mandrel.

9. Apparatus for forming glass tubing which comprises, a hollow inclined mandrel, provided at its lower end with a hollow refractory portion, means constituting bearings for the mandrel and for continuously rotating the mandrel, means for permitting the passage along said mandrel and past said bearing means of a succession of said glass billets without interruption of the rotation of the mandrel, means for heating the lower end of the mandrel and melting the billets thereon, and means for drawing glass tubing from the billets as melted.

10. Apparatus for drawing glass tubing from a series of annular pressed glass billets which comprises, a hollow mandrel upon which the series of billets may be threaded, means for supporting the mandrel in a position inclined from the vertical and for continuously rotating the mandrel, and means for permitting the successive glass billets to pass down the incline of the mandrel without interrupting the continuous rotation of the mandrel.

11. Apparatus for forming glass tubing from pressed glass billets which comprises, means for supporting a succession of said billets and for continuously rotating the same and for moving the same successively into a furnace, a furnace into which the billets are successively moved for melting the billets, means for drawing glass tubing from the melted billets, and means for providing compressed air within the tubing.

12. In glass tube forming apparatus provided with an inclined mandrel for the reception of a continuous series of annular glass billets, means for continuously reducing the lower end of such series to molten glass, means for supporting and continuously rotating the mandrel comprising a plurality of sets of gripping members, means for rotating each set, and individual clutch mechanism associated with each set of the gripping members to move the members into an outer gripping relation with the mandrel.

13. In apparatus for forming glass tubing including a hollow mandrel adapted to receive a continuous series of pressed glass billets and to continuously present them to a melting zone, means for supporting and continuously rotating the mandrel comprising a plurality of units, each having gripping jaws movable into and out of gripping relation with the mandrel, means for rotating the jaws, clutch means for moving the jaw members into and out of clutching relation with the mandrel, and means associated with the jaw members in supplying compressed air to the interior of the mandrel when the jaws are in gripping relation therewith.

14. In apparatus for forming glass tubing from a continuous series of annular pressed glass billets including an inclined hollow mandrel adapted to receive the billets, means for successively melting the billets, means for drawing glass from the melted billets, means for supporting and continuously rotating the mandrel and for supplying compressed air to the interior thereof, said means comprising a plurality of units each including an annular bearing member, annular rotating chuck member provided with jaws movable into and out of gripping relation with the mandrel, and a clutch element adapted to move the jaws into and out of gripping relation with the mandrel whereby alternate billets may be moved in the mandrel-part of the unit and the mandrel may be supported and rotated by the unit, means for supplying compressed air through the gripping jaw to the interior of the mandrel when in gripping relation, and means for preventing the escape of compressed air from the mandrel when the jaws are out of gripping relation therewith.

Signed at Hartford, Conn., this 7th day of December, 1928.

KARL E. PEILER.